Feb. 22, 1966

D. J. FOOTE 3,236,372

BICYCLE LOCK SLEEVES

Filed Oct. 21, 1964

INVENTOR.
Daniel J. Foote
BY *Morsell & Morsell*
Attorneys

United States Patent Office 3,236,372
Patented Feb. 22, 1966

3,236,372
BICYCLE LOCK SLEEVES
Daniel J. Foote, Wauwatosa, Wis., assignor to Master Lock Company, Milwaukee, Wis., a corporation of Wisconsin
Filed Oct. 21, 1964, Ser. No. 405,458
6 Claims. (Cl. 206—78)

This invention relates to improvements in bicycle lock sleeves, and more particularly to a display type of sleeve to envelop the shackle portion of a bicycle padlock.

Padlocks are customarily used for locking bicycles, similar vehicles, refrigerators, freezers, duffel bags and for other miscellaneous usages, and such padlocks customarily have elongated shackles. The standard practice is for the manufacturer to dispose a bicycle padlock and its keys within an enclosing carton or box, in which condition the bicycle locks are shipped and are thus ultimately disposed on dealers' shelves or counters for sale to customers. A bicycle padlock disposed within a carton or box is not readily visible to the prospective purchaser and, with the keys disposed in the carton or box, there is also the possibility that the keys may become lost or mixed up.

Recognizing the fact that the conventional carton enclosure for a bicycle padlock fails to attractively display the padlock, the present invention provides a sleeve adapted to be slipped onto the major portion of the elongated shackle of a bicycle padlock in encasing relation thereto, which sleeve can contain advertising indicia and display matter, and which will also carry the keys for the particular padlock and prevent the same from becoming misplaced, the sleeve being such that the characteristics of the padlock and assemblage are readily visible to the prospective purchaser for inspection or test manipulations.

A further object of the invention is to provide a bicycle padlock sleeve which can be folded from a flat one-piece paperboard blank and which, in its assembled condition, may be easily slipped onto the long shackle portion of a bicycle padlock, thereby forming a neat advertising display and encasing sleeve for a portion of the assemblage, while also holding and displaying the key ring and keys for the encased padlock.

Very frequently it is desirable for a dealer to mount articles for sale on an exposed pegboard or the like, and the improved bicycle padlock sleeve readily adapts the bicycle padlock assemblage for mounting on a pegboard or hook for display purposes, inasmuch as the shackle-encasing sleeve exposes the closed outer end portion of the lock shackle and thus permits the outer end of the shackle to be hung from a support on a pegboard display or hook, whereby the padlock assemblage is visible to a prospective purchaser and is attractively displayed with its shackle-encasing sleeve.

A further object of the invention is to provide a bicycle padlock sleeve which is of very simple construction; which is strong and durable; which may be securely associated with the long shackle of a bicycle padlock to be carried by the latter during shipment and display; which is unique and attractive in appearance; and which is well adapted for the purposes described.

With the above and other objects in view, the invention consists of the improved bicycle padlock sleeve and its parts and combinations, as set forth in the claims, and all equivalents thereof.

In the accompanying drawings, in which the same reference characters indicate the same parts in all of the views.

Figure 1:
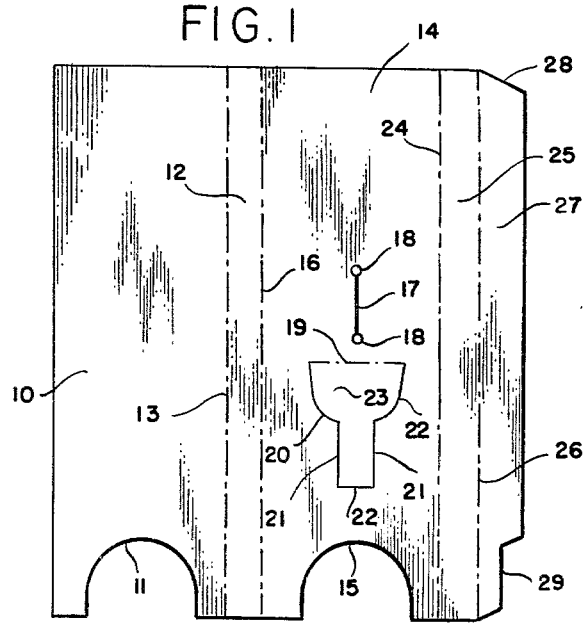
FIG. 1 is a plan view of the outstretched flat one-piece blank from which the improved bicycle padlock sleeve is folded or "set up"

Referring now more particularly to FIG. 1 of the drawing, it will appear that the improved bicycle padlock sleeve blank from which the sleeve is folded is of one piece, and it may be formed of paperboard, cardboard, or any other similar suitable material. The numeral 10 designates that portion of the blank which ultimately forms the rear face of the sleeve and it is of generally rectangular shape, except that the lower margin has formed therein a curved recess 11. That portion of the blank which forms a narrow side wall of the sleeve is designated by the numeral 12 and it is joined to an inner longitudinal marginal portion of the rear face panel 10 by a fold line 13. The numeral 14 indicates that portion of the blank which ultimately forms the front face of the sleeve, and it is of the same size and proportion as the rear face panel 10 and is likewise formed along its lower margin with a curved recess 15 which, in the "set up" condition of the sleeve, coincides with the rear face panel curved recess 11. One longitudinal marginal portion of the front face panel 14 is secured to the other longitudinal edge of the side wall 12 by a fold line 16. In an intermediate portion of the front wall panel 14 there is a vertical slit 17, slightly enlarged at its extremities as at 18. In an intermediate portion of the front wall panel 14 of the blank, below the slit 17, there is defined by an upper transverse fold line 19 and eccentrically-shaped lines of cut 20, 21, and 22 a toadstool-shaped inwardly deflectable tab 23. Joined to the other longitudinal margin of the front face flap 14, by a line of fold 24, is another side wall-forming panel 25 similar in size and shape to the side wall-forming panel 12. The other longitudinal margin of the side wall-forming panel 25 is secured to an inner longitudinal margin of a securing flap 27 by a line of fold 26. The narrow securing flap 27 has its upper edge portion slightly angled as at 28 and its lower marginal portion is stepped or shouldered as at 29.

Figure 2:
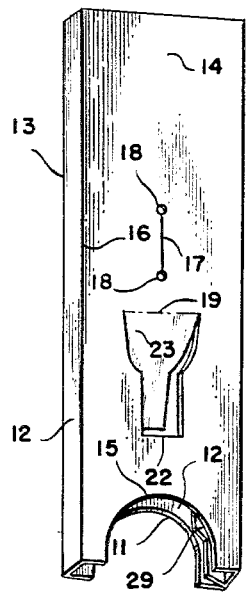
FIG. 2 is a front and side perspective view of the bicycle padlock sleeve in its assembled or "set up" condition, prior to being mounted on the shackle of a bicycle padlock and having engaged therein a key-carrying ring.

When the sleeve is to be set up or formed from the blank shown in FIG. 1, it is merely necessary to fold the various walls on the lines of fold 13, 16, 24, and 26, and the outermost face of the securing flap 27 is underlapped relative to outer longitudinal marginal portion of the inner face of the rear wall-forming panel 10 and is secured thereto by a suitable adhesive. The panel thus "set up" takes the form of the sleeve depicted in FIG. 2 of the drawing, although for purposes of storage and shipment the set up sleeve can be flattened so that the end wall 12 is parallel with the front wall 14 and the end wall 25 is parallel with the rear wall 10. When arranged in the condition of FIG. 2, however, the sleeve is elongated and of generally rectangular shape, open at both ends and hollow to adapt the sleeve to be slid over the outer closed end of a shackle 30 of a bicycle padlock, with the lower end of the sleeve engaging the top of the padlock body and with the top of the sleeve terminating substantially below and exposing the closed outer end portion of the shackle 30.

The bicycle padlock is of conventional construction and includes a body portion 31 having spaced-apart vertical bores 32 therethrough to receive in adjusted locked condition the lower end portions of the legs 33 of the padlock shackle. The sleeve completely encases the major extent of the padlock shackle 30, but is of such a character that it leaves visible the main elements of the padlock. The encasing sleeve may also bear suitable advertising indicia and display material.

Figure 3:
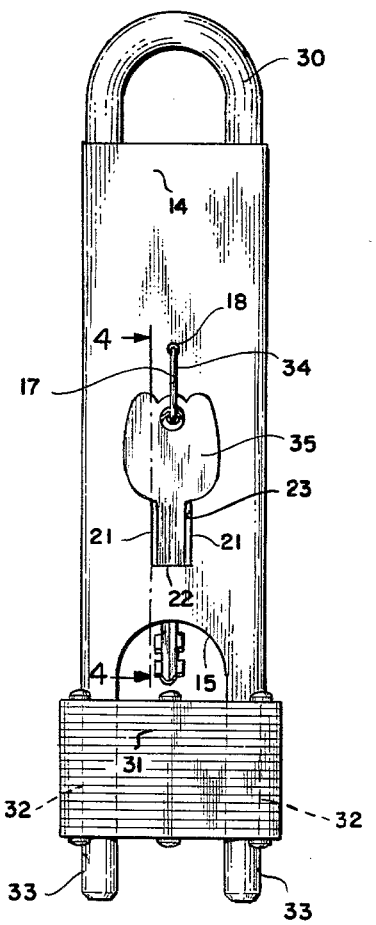
FIG. 3 is a front view of a bicycle padlock having the improved sleeve mounted on the closed shackle of the padlock in a display position and carrying a ring and set of keys for the particular padlock.
Figure 4:
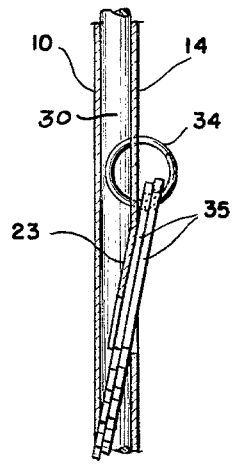
FIG. 4 is a fragmentary vertical sectional view taken approximately along the line 4—4 of FIG. 3.

A padlock assembly customarily includes a set of keys for the particular padlock, and the improved sleeve is constructed so as to detachably hold in a secure position a pair of keys for the padlock in question. The numeral 34 designates a conventional key ring on which are mounted a pair of keys 35 for the encased padlock. In the condition in which the assemblage may be shipped and displayed, the key ring 34 is inserted into the slit 17 in the front wall panel 14 of the sleeve in the position, best shown in FIG. 4, wherein the key ring is frictionally held against undesired displacement. The depending keys 35 overly the inwardly deflectable toadstool-shaped tab 23. The latter is deflected inwardly into the sleeve in the manner shown in FIG. 4, and the depending keys 35 extend through the opening in the front panel of the sleeve formed by the inward deflection of the tab, with the result that the keys assume the position shown in FIGS. 3 and 4. The coinciding curved cutouts 11 and 15 in the lower portions of the rear and front panels 10 and 14 of the sleeve neatly expose the lower ends of the shanks of the keys. However, the key ring and keys are firmly held to and partially within the sleeve, but are readily visible and may be removed by withdrawing the key ring 34 from its slot 17, pulling with it the keys. Thus, a prospective purchaser may readily insert the keys into the padlock key hole and manipulate the padlock for test purposes.

It will thus appear that when a bicycle padlock has mounted on its elongated shackle one of the improved encasing sleeves, which also carries a pair of companion keys, the entire assemblage is visible to a prospective purchaser. Moreover, the unencased upper closed end of the padlock shackle permits the assemblage to be hung from a display pegboard or hook in a retail shop.

The improved bicycle lock sleeve, with its means for carrying a set of keys for the particular lock, is of unique appearance and eliminates the need for confining the padlock in a box or carton or other packaging device, rendering the assemblage readily visible and available for inspection and testing. The associated keys are maintained with the assemblage so that they cannot become misplaced or lost.

The improved bicycle lock sleeve is inexpensive to manufacture, is easy to "set up," is compact and convenient to apply to a bicycle padlock shackle, forms a unique and attractive display for the goods, and is well adapted for the purposes described.

What is claimed as the invention is:

1. A display package, comprising an elongated hollow sleeve of rectangular section having a flat face portion, a shackle-equipped padlock having the major portion of its shackle encased within said sleeve, said flat face portion of the sleeve having a slit therein, and a key ring removably engaging said face portion slit and having a key depending therefrom whose shank portion is disposed adjacent a portion of said sleeve face portion.

2. A display package, comprising an elongated hollow sleeve of rectangular section having a flat face panel, a shackle-equipped padlock having the major portion of its shackle encased within said sleeve, an intermediate portion of said face panel of the sleeve having a slit therein parallel with the longitudinal axis of the sleeve, and a key ring removably engaging said face panel slit and having keys depending therefrom whose shank portions are disposed adjacent a portion of said sleeve face panel.

3. A display package, comprising an elongated hollow, open-ended sleeve of rectangular section and having a flat face panel formed intermediate its edges with a longitudinally directed slit, a shackle-equipped padlock having the major portion of its shackle encased within said sleeve, the outer end portion of the shackle being closed, means forming an opening in said panel below the slit therein, and a key ring removably engaging said face panel slit and having keys depending therefrom whose shank portions extend into the sleeve through said opening.

4. A display package, comprising an elongated hollow sleeve of rectangular section and having a flat face panel formed with an intermediately positioned slit, a padlock formed with a body portion and an elongated shackle, the latter extending into and being substantially encased by said sleeve, a portion of the face panel of the sleeve adjacent the slit being formed with a partially severed, inwardly deflectable tab, and a key ring removably engaging said panel slit at right angles to the plane of the face panel and having a key depending therefrom whose shank portion overlies said inwardly deflectable tab and extends into the sleeve through the opening exposed by the inwardly deflected tab.

5. A display package, comprising a padlock formed with a body portion and an elongated shackle whose outer end portion is closed, an elongated hollow sleeve of rectangular section having a face panel formed with an intermediately positioned, longitudinally directed slit, a portion of the face panel of the sleeve adjacent the slit being formed with a partially severed, inwardly deflected tab, said sleeve removably encasing all of the shackle except its closed outer end portion, and a key ring removably engaging said panel slit at right angles to the plane of the face panel and having keys depending therefrom whose shank portions overlie said inwardly deflected tab and extend into the sleeve through the opening exposed by the inwardly deflected tab.

6. A display package, comprising a padlock formed with a body portion and an elongated shackle whose outer end portion is closed, an elongated hollow sleeve of rectangular section having a rear panel and a front face panel, the latter being formed with an intermediately positioned, longitudinally directed slit, a portion of the face panel of the sleeve below the slit being formed with a partially severed, inwardly deflected tab and the lower portion of said face panel below the tab being formed with a cut-out, said sleeve removably encasing all of the shackle except its closed end portion, and a key ring removably engaging said panel slit at right angles to the plane of the face panel and having keys depending therefrom whose shank portions overlie said inwardly deflected tab and extend into the sleeve through the opening exposed by the inwardly deflected tab, the lower shank portions of the keys being visible through said cut-out.

References Cited by the Examiner

UNITED STATES PATENTS

| 538,219 | 4/1895 | Baskerville | 217—29 |
| 1,217,375 | 2/1917 | Warren | 206—44.11 |
| 1,999,660 | 4/1935 | Mosely | 206—46 |
| 2,107,695 | 2/1938 | Geare | 206—46 |
| 2,557,970 | 6/1951 | Jablon | 206—79 |

LOUIS G. MANCENE, *Primary Examiner.*